United States Patent
Franz et al.

(10) Patent No.: US 7,092,102 B2
(45) Date of Patent: Aug. 15, 2006

(54) MEASURING DEVICE FOR DETECTING THE DIMENSIONS OF TEST SAMPLES

(75) Inventors: Stefan Franz, Stuttgart (DE); Robert Windecker, Ettlingen (DE)

(73) Assignee: Joh. & Ernst Link GmbH & Co. KG, Stuttgart (DE)

(*) Notice: Subject to any disclaimer, the term of this patent is extended or adjusted under 35 U.S.C. 154(b) by 246 days.

(21) Appl. No.: 10/311,750

(22) PCT Filed: Jun. 15, 2001

(86) PCT No.: PCT/DE01/02258

§ 371 (c)(1),
(2), (4) Date: Jul. 17, 2003

(87) PCT Pub. No.: WO01/98732

PCT Pub. Date: Dec. 27, 2001

(65) Prior Publication Data

US 2004/0090635 A1    May 13, 2004

(30) Foreign Application Priority Data

Jun. 21, 2000  (DE) ................................ 100 29 383

(51) Int. Cl.
  *G01B 9/02* (2006.01)
  *G01N 21/00* (2006.01)
(52) U.S. Cl. .................. 356/497; 356/511; 356/241.1
(58) Field of Classification Search .. 356/241.1–241.6, 356/479, 497, 489, 495, 501, 511–515

See application file for complete search history.

(56) References Cited

U.S. PATENT DOCUMENTS

| | | | | |
|---|---|---|---|---|
| 4,153,370 A | * | 5/1979 | Corey, III ................... | 356/501 |
| 5,434,669 A | * | 7/1995 | Tabata et al. ............ | 356/241.5 |
| 5,810,719 A | * | 9/1998 | Toida ......................... | 356/495 |
| 5,933,237 A | * | 8/1999 | Drabarek .................... | 356/511 |
| 6,462,815 B1 | * | 10/2002 | Drabarek et al. ........ | 356/241.1 |
| 6,724,485 B1 | * | 4/2004 | Drabarek .................... | 356/485 |
| 6,741,355 B1 | * | 5/2004 | Drabarek .................... | 356/479 |
| 6,822,746 B1 | * | 11/2004 | Prinzhausen et al. ....... | 356/497 |

* cited by examiner

*Primary Examiner*—Hoa Q. Pham
*Assistant Examiner*—Patrick Connolly
(74) *Attorney, Agent, or Firm*—Gudrun E. Huckett

(57) ABSTRACT

A measuring device for detecting dimensions of bores has a light source emitting a light beam and a beamsplitter for splitting the light beam into a reference beam and a measuring beam. A reference mirror is arranged downstream of the beam splitter. The measuring beam is supplied to a measuring location of the bore and reflected on it. The reference beam is supplied to the reference mirror and reflected on it. The reflected beams are temporally incoherent and are recombined on the beamsplitter to form a recombined beam supplied to a receiver. Reference mirror and receiver have a lateral displacement relative to an optical axis of the measuring device, or the reference mirror is arranged laterally adjacent to the optical axis and the beam splitter at a slant to the optical axis. The measuring device is integrated into a tool or connected to a tool receptacle.

35 Claims, 4 Drawing Sheets

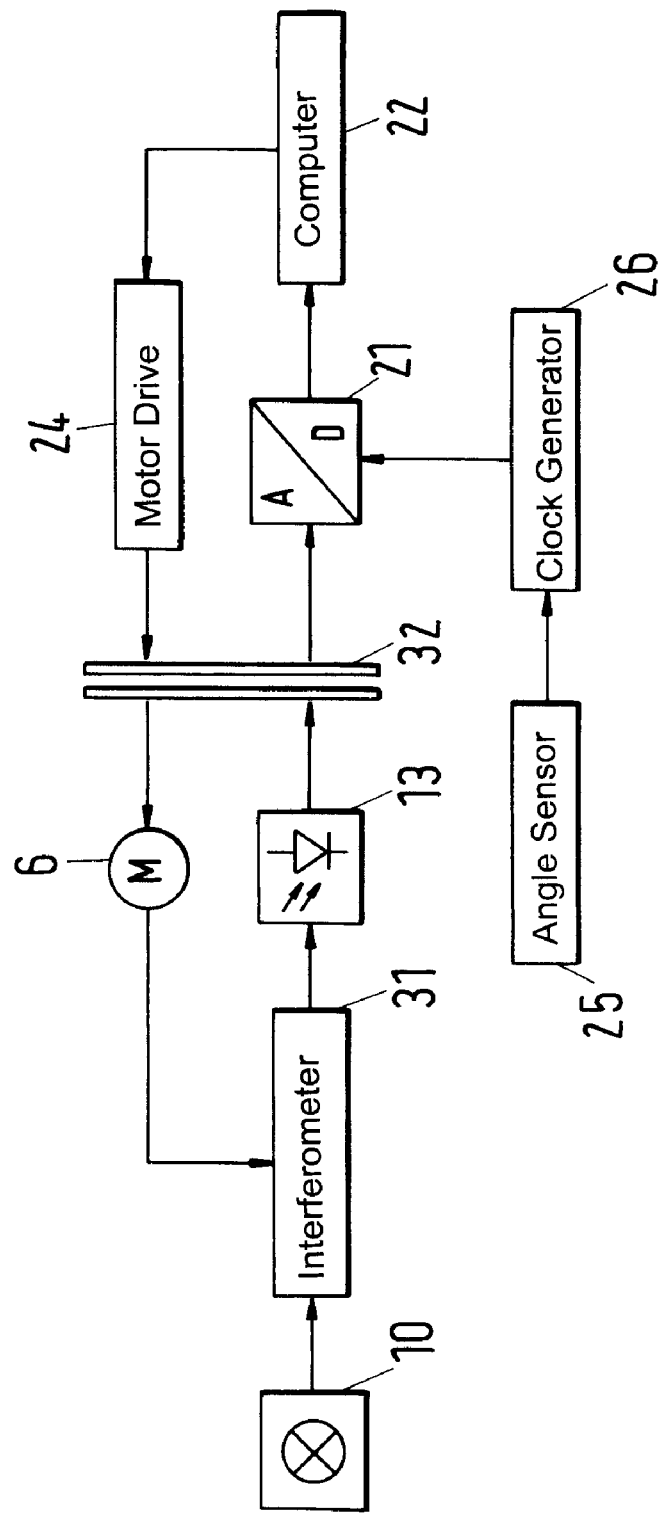
Fig. 5   Information Flow Schematic of the Bore Hole Sensor

MEASURING DEVICE FOR DETECTING THE DIMENSIONS OF TEST SAMPLES

BACKGROUND OF THE INVENTION

1. Field of the Invention

The invention relates to a measuring device for detecting dimensions of test samples, in particular, of hollow bodies, preferably of recesses in workpieces.

2. Description of the Related Art

When manufacturing bores, seats, and the like in workpieces, it is necessary that the bores have a precise diameter. For this reason, the bores are measured with corresponding measuring devices after the drilling process. When imprecise dimensions are detected, after machining is required.

SUMMARY OF THE INVENTION

The invention has the object to configure the measuring device of the aforementioned kind such that measuring is possible with great precision.

According to the present intention, this object is solved for a measuring device of the aforementioned kind according to a first configuration in that the measuring device can be integrated into a tool or, in place of a tool, can be connected to a tool receptacle and comprises at least one light source whose light beams are divided by a beamsplitter into a reference beam and a measuring beam, of which the measuring beam forming a measuring arm can be supplied to a measuring location of the test sample and the reference beam forming a reference arm can be supplied to a reference mirror, wherein the temporally incoherent beams reflected on the measuring location and on the reference mirror are recombined on the beamsplitter and supplied to a receiver, and wherein the reference mirror and the receiver have a lateral displacement relative to the optical axis of the measuring device. According to a second configuration, this is achieved in that the measuring device can be integrated into a tool or, in place of a tool, can be connected to a tool receptacle and comprises at least one light source whose light beams are divided by a beamsplitter into a reference beam and a measuring beam, of which the measuring beam forming a measuring arm can be supplied to a measuring location of the test sample and the reference beam forming a reference arm can be supplied to a reference mirror, which is positioned laterally adjacent to the optical axis of the measuring device, wherein the temporally incoherent beams reflected on the measuring location and on the reference mirror are recombined on the beamsplitter and can be supplied to a receiver, and wherein the beamsplitter is arranged at a slant to the optical axis of the measuring device.

With the measuring device according to the invention according to claim 1 the dimensions of test samples, for example, the diameter of bores in workpieces can be determined with high precision but still in a simple fashion. The beam which is emitted by the light source is divided by the beamsplitter into a reference beam and into a measuring beam. While the measuring beam is deflected to the measuring location on the test sample, the reference beam is deflected to a reference mirror. After reflection on the measuring location or the reference mirror, both beams are recombined and guided to the receiver. Because of the superposition of the beams, an interference contrast results based on which the desired information in regard to the measured dimension of the test sample can be obtained.

Since the reference mirror and the receiver in regard to the optical axis of the measuring device have a lateral displacement, the reference mirror and the receiver are thus not positioned on the optical axis but are positioned adjacent thereto. With such a configuration, a very high measuring precision can be obtained.

In the measuring device according to claim 5 the beamsplitter is positioned at a slant to the optical axis of the measuring device. In this case, only the reference mirror is arranged adjacent to the optical axis of the measuring device while the light source and/or the receiver can be positioned on the optical axis.

Further features of the invention result from the additional claims, the description, and the drawing.

BRIEF DESCRIPTION OF THE DRAWING

The invention will be explained in the following in more detail by means of an embodiment illustrated in the drawing. It is shown in:

FIG. 5 an information flow schematic of the measuring device according to the invention arranged in a tool.

DESCRIPTION OF THE PREFERRED EMBODIMENTS

By means of the tool, dimensions on workpieces, preferably of bores, can be measured simply and precisely. The measuring device provided for this purpose is arranged in the tool which can be, for example, a drilling tool or a thread milling cutter. With the measuring device it is also possible to measure groove depth or the bore depth in a workpiece. The measurement can be carried out during the machining operation performed by the tool. As a result of the measurement, the tool and/or the workpiece to be machined can be adjusted online until the nominal result is achieved. The machining result, for example, roundness of a bore or its diameter, is preferably directly measured and evaluated during machining. In this way, machining errors can be detected and corrected immediately. The finishmachined workpiece does not require any additional check. Since a correction can be performed during machining, very short machining times and primarily excellent product qualities can be obtained. Also, the tool service life is utilized optimally because, as a result of the online measurements and online evaluation during machining, the tool can be used for machining for the optimal length of time.

It is also possible to perform with the tool machining on workpiece and to measure and evaluate directly subsequently thereto the machining result. When the machining result does not conform to the desired requirements, directly subsequently thereto the tool and/or workpiece movement is corrected by the required amount and after machining is performed.

Figure 1:
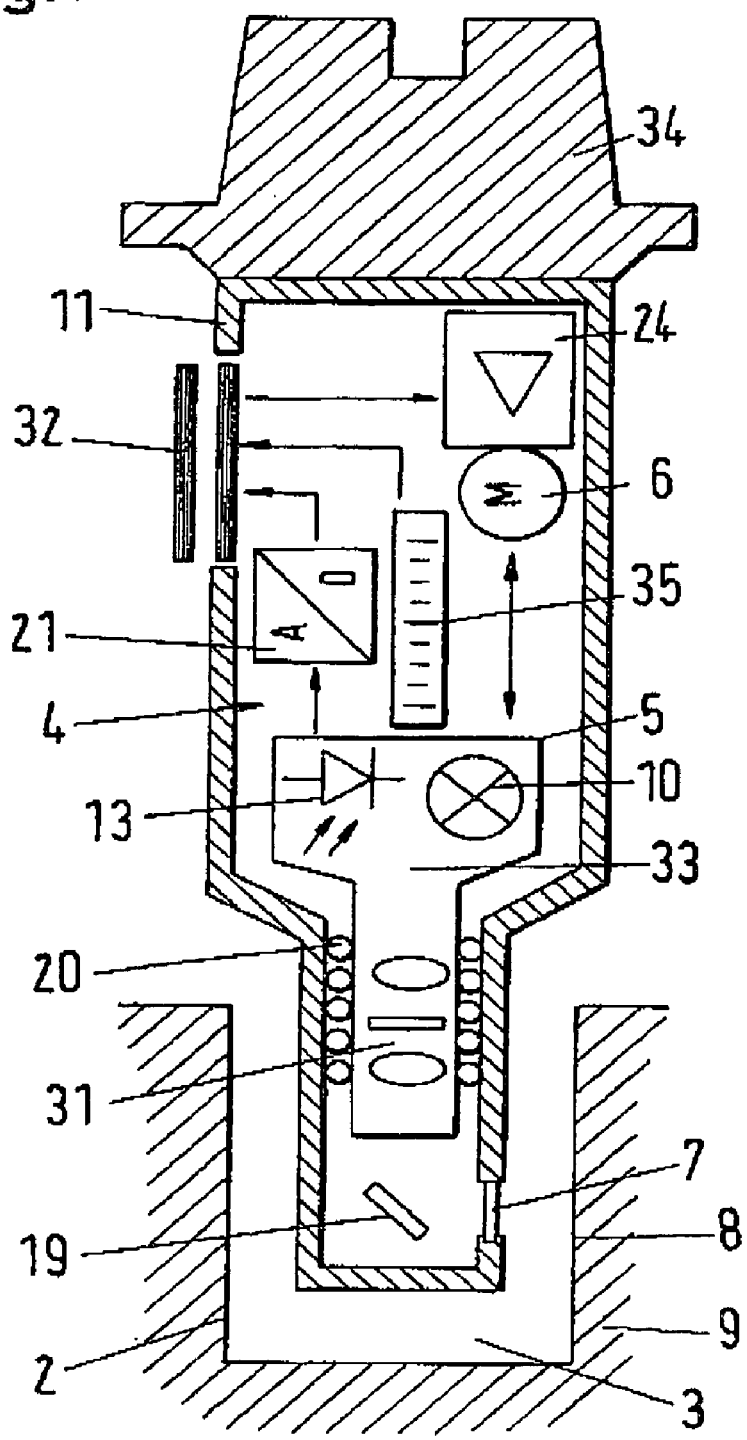
FIG. 1 in a schematic illustration and in section a tool and a device according to the present intention.
Figure 2:
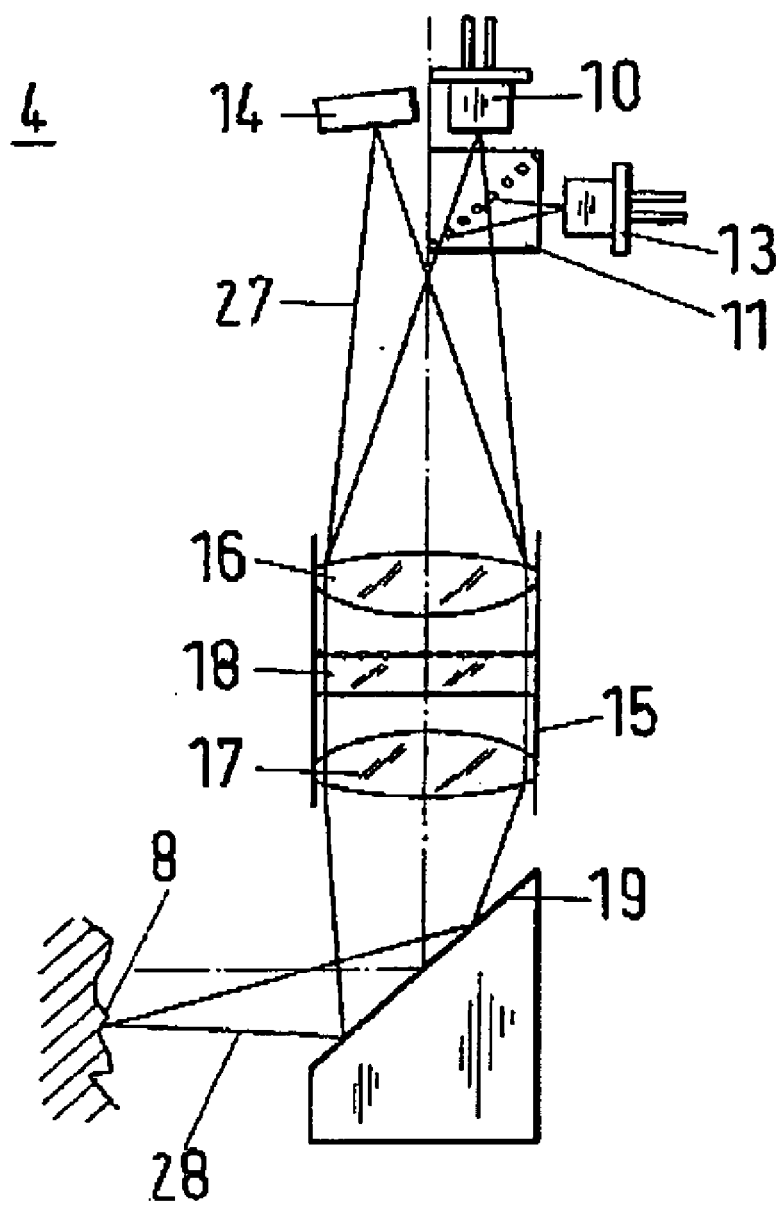
FIG. 2 an optical schematic of the measuring device according to FIG. 1.

FIG. 1 shows a schematic illustration of a milling tool 1 with a shaft 34. By means of the tool a bore is drilled into a workpiece 2 as is known in the art. The tool 1 is embodied as a hollow body in which a measuring device 4 is arranged. It has a housing 5 in which most of the elements of the measuring device 4 are arranged so as to be protected. It can be moved by means of a linear drive 6 in the axial direction of the tool 1. The tool 1 has near the free end at least one window 7 through which in a way to be described in the following a measuring beam can exit the tool 1 and reach the measuring location 8. In the illustrated embodiment, it is provided in the wall 9 of the bore 3.

The measuring device 4 has a light source 10 which is embodied as a broadband light source and advantageously is in the form of an LED. The light source 10, for example, can also be comprised of a halogen lamp, a superluminescent diode, a laser diode and the like. Downstream thereof, a beamsplitter 11 is provided for deflecting the light emitted by the light source 10 to a lens system 15. It is comprised of a collimator 16, a lens 17, and an intermediately positioned beamsplitter 18. On it a portion of the beam is reflected to a reference mirror 14. The lens system 15 is positioned on the axis of the measuring device 4. The reference mirror 14, the light source 10, and the beamsplitter 11 are positioned outside of the optical axis of the measuring device 4.

The lens system 15 is illustrated in a simplified fashion. The beam path within the lens system 15 can deviate from the optical axis.

The lens system 15 has arranged downstream thereof a deflection mirror 19 for deflecting the light beam 28 passing through the beamsplitter 18 through the window 7 in the tool 1 to the measuring location 8 in the bore wall 9.

As illustrated in FIG. 1, the measuring device 4 has an interferometer 31 which is arranged in the housing 5. The deflection mirror 19 is outside of the housing 5 which is axially slidably supported by means of a linear bearing 20 in the tool 1.

The light emitted by the light source 10 is deflected on the beamsplitter 11 to the lens system 15. By means of the beamsplitter 18, a light beam 27 is reflected to the reference mirror 14 where this light beam is reflected back to the beamsplitter 18. The light beam 28 allowed to pass through the beamsplitter 18 is guided to the deflection mirror 19 which guides the light beam onto the measuring location 8. The light beam is then reflected back to the deflection mirror 19. The light beam 28 is then deflected from here to the beamsplitter 18.

By means of the beamsplitter 18, the light beam 27 reflected by the reference mirror 14 and the light beam 28 coming from the deflection mirror 19 are recombined and then guided to a receiver 13. It is an opto-electrical receiver, for example, in the form of a photo diode. The receiver 13 is positioned outside of the optical axis of the measuring device 4. Accordingly, the combined light beams 27, 28 are deflected on the beamsplitter 11 to the receiver 13 as an interference beam.

The light beams 27, 28 received by the receiver 13 are now supplied to an analog-to-digital converter 21 whose converted digital signals are then evaluated by a computer 22 (FIG. 5) arranged downstream. The signal evaluation can be performed in an analog way.

The receiver 13 can also be an intelligent photosensor array with signal broadening, for example, including A/D conversion and/or signal amplification. The obtained signals can be guided directly to the computer.

Since the bore wall 9 is to be measured about its periphery by interference measurement, the measuring device 4 provided with the interferometer 31 is rotated. It is possible to rotate the measuring device 4 within the tool 1 wherein, depending on the desired measuring precision, the measuring device 4 is rotated about certain rotational angles. Subsequently, the described interference measurement is performed. As soon as the measuring result has been evaluated in the computer, the measuring device 4 is rotated by the next angular step. In this way, the entire periphery of the bore wall 9 can be measures step-wise. In this case, a corresponding number of windows 7 is provided.

It is also possible to measure the entire tool 1 with the measuring device 4 at a constant speed and to measure continuously during the course of rotation.

The analog/digital converter 21 receives via an angle sensor 25 and the clock generator 26 arranged downstream the required clock signals. An angle sensor is not required when the angular position or the rate of angular movement of the machine tool can be preset precisely.

After a complete rotation of the tool 1 or of the measuring device 4, the measuring device, by means of the linear drive 6, or the tool 1, by means of the drive of the machine tool, is moved by the desired amount so that the light beam exiting from the window 7 of the tool 1 impinges on a different peripheral plane of the bore wall 9. The linear movement of the measuring device 4 or of the interferometer 31 is realized by a motor 6 (FIG. 5) arranged downstream of the computer 22 (FIG. 5) and controlled by the computer by means of a motor drive 24. The linear movement of a sensor head 33 generated by the linear drive 6 and guided in the linear bearing 20 is measured by a travel measuring system 35 and also controlled by it. The travel measuring system 35 is arranged within the tool 1. In the described way, the tool 1 and/or the measuring device 4 is rotated about its axis in order to measure the bore wall 9 in the new axial position. In this way, the bore wall 9 can be measured across a part of its axial length or even across its entire axial length.

FIG. 5 shows schematically also the data transmission from the rotating measuring system to the stationary computer 22. The data and energy transmissions of the rotating measuring system 4 to the stationary computer 22 and the motor drive 24 is carried out bidirectionally and, as is known in the art, is realized by inductive coupling 32 with sending and receiving parts as well as rotating and stationary antennas. FIG. 1 shows a further system location where the coupling 32 can be provided, i.e., on the shaft of the tool.

Figure 4:
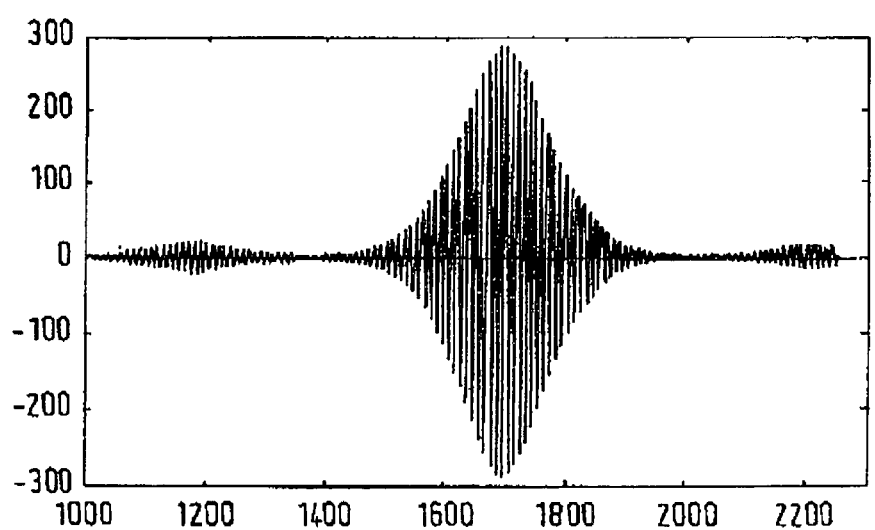
FIG. 4 a measuring signal which has been recorded with the measuring device.

Inasmuch as the measuring location 8 is located on the desired diameter, the two beam paths of the reference and measuring arms 27, 28 are of the same size. The measuring signal, which in FIG. 4 is shown in an exemplary fashion, has a maximum in this case. In the diagram according to FIG. 4 the intensity is plotted against the distance. Based on the position of the maximum of the interference contrast, the radius of the bore 9 can be determined. The intensity of the measuring signal results in a way known in the art according to the following equation:

$$I(\Delta s) = I_0 \{1 + m \, y_{21} (\Delta s) \cos (2\pi/\lambda \cdot \Delta s + \phi)\}$$

with the following meaning:
m=modulation factor
$Y_{21}$=bidirectional degree of coherence
λ=average wavelength
Δs=optical distance difference
φ=material-dependent phase jump.

The modulation factor m depends on the light intensity and the reflection factor. At the maximum of the interference signal (FIG. 4) the optical distance difference Δs is zero. By means of the measuring device 4 the optical distance difference Δs between the reference beam 27 and the measuring beam 28 is tuned by moving the beamsplitter 18 in the direction of the measuring beam 28, and the interference contrast (FIG. 4) detected in this way is evaluated. For example, when the measuring location 8 deviates from the desired diameter, the measuring beam 28 has a different length than the reference beam 27 which has a constant length. The sensor head 33 is moved across the entire measuring area and the interference signal is recorded in this way. Subsequently, the interference maximum is determined as a function of the traveled distance. Based on this, the diameter of the bore can be determined.

Smaller shape deviations can be detected by moving the reference mirror 14 and recording the corresponding travel distance. In this connection, the interference signal is also recorded and the interference maximum evaluated as a function of the travel distance.

Figure 3:
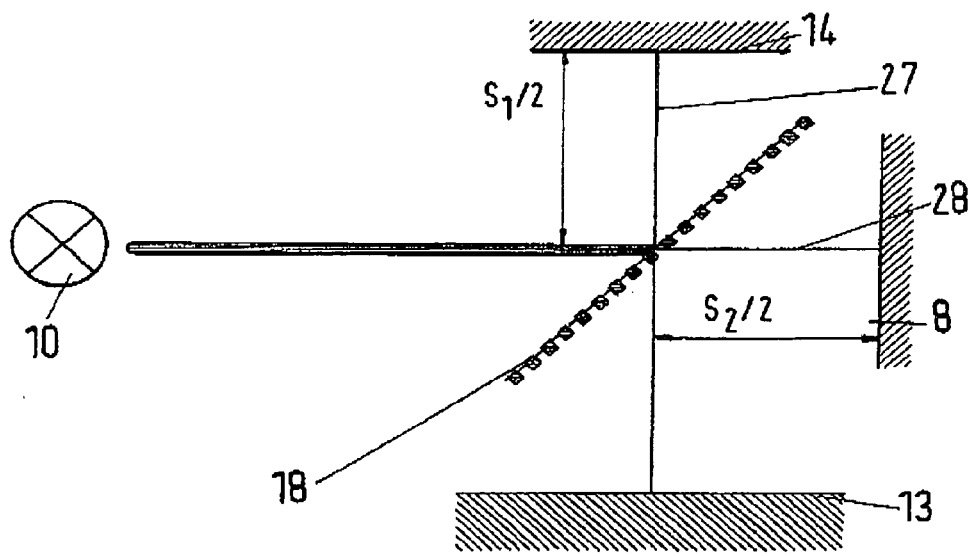
FIG. 3 in a schematic illustration the function of the measuring device.

FIG. 3 shows the principal function of the measuring device 4. The light emitted by the light source 10 is divided by the partially transmissive mirror 18 into the reflected beam 27 and into the passing beam 28. The reflected beam 27 reaches in the described way the reference mirror 14 on which it is reflected back onto the splitter mirror 18. The passing beam 28 impinges on the measuring location 8 where it is reflected. The two partially coherent beams 27, 28 are recombined on the splitter mirror 18 and cause interference. The two combined beams then reach the receiver 13. The evaluation of the interference contrast enables a resolution of less than 1 µm.

In the described measuring device 4 the light source 10, the receiver 13, and the reference mirror 14 are not positioned on the optical axis of the measuring device, but are separated by a lateral displacement. This arrangement reliably prevents particularly reflections.

In a further embodiment (not illustrated), the beamsplitter 18 is positioned slantedly. In this case, only the reference mirror 14 is positioned adjacent to the optical axis. The light source 10 and the receiver 13 in this case can be arranged on the optical axis of the measuring device.

The invention claimed is:

1. A measuring device for detecting dimensions of test samples in the form of hollow bodies having a recess, the measuring device comprising:
   at least one light source emitting a light beam;
   a beamsplitter arranged downstream of the light source and configured to split the light beam into a reference beam and a measuring beam;
   a reference mirror arranged downstream of the beam splitter, wherein the measuring beam forming a measuring arm is supplied to a measuring location of a test sample and is reflected on the measuring location as a first reflected beam and the reference beam forming a reference arm is supplied to the reference mirror and is reflected on the reference mirror as a second reflected beam;
   wherein the first and second reflected beams are temporally incoherent and are recombined on the beamsplitter to form a recombined beam;
   a receiver arranged such that the recombined beam impinges on the receiver;
   wherein the reference mirror and the receiver are laterally displaced away from an optical axis of the measuring device at lateral spacing relative to the optical axis;
   wherein the measuring device is configured to be integrated into a tool or to be connected to a tool receptacle.

2. The measuring device according to claim 1, wherein the light source and the reference mirror have a lateral displacement relative to the optical axis of the measuring device and are positioned on the same side of the beam splitter.

3. The measuring device according to claim 1, wherein the beam splitter guides the reference beam directly onto the reference mirror.

4. The measuring device according to claim 1, wherein the axis of the reference beam between the beamsplitter and the reference mirror extends angularly to the optical axis of the measuring device.

5. The measuring device according to claim 1, wherein an optical travel distance difference ($\Delta s$) between the measuring arm and the reference arm is tuned.

6. The measuring device according to claim 1, further comprising a computer, wherein the receiver is connected to the computer and the computer evaluates the signals received from the receiver.

7. The measuring device according to claim 6, further comprising an analog/digital converter positioned the receiver and the computer.

8. The measuring device according to claim 1, wherein a tool in which the measuring device is arranged has at least one through opening allowing the measuring beam to reach the measuring location.

9. The measuring device according to claim 1, wherein the measuring device is driven in rotation about an axis of the measuring device.

10. The measuring device according to claim 1, wherein the measuring device, when arranged in a tool is driven in rotation about an axis of the measuring device.

11. The measuring device according to claim 1, wherein the measuring device is rotated together with a tool in which the measuring device is arranged.

12. The measuring device according to claim 1, further comprising a protective housing for enclosing at least one of the light source, the beam splitter, the reference mirror, and the receiver, wherein the housing is arranged in the tool.

13. The measuring device according to claim 12, wherein at least one part of the measuring device is movable in the direction of an axis of the measuring device.

14. The measuring device according to claim 13, wherein the housing is axially movable within the tool.

15. The measuring device according to claim 12, further comprising a linear drive controlled by a computer for moving the at least one part of the measuring device.

16. The measuring device according to claim 1, further comprising a travel measuring system, wherein the measuring device and the tool in which the measuring device is arranged are axially movable, and wherein the travel measuring system is configured to detect a travel distance of the measuring device.

17. The measuring device according to claim 16, wherein the travel measuring system is arranged in the tool.

18. The measuring device according to claim 1, wherein the reference mirror is positioned spaced from an axis of rotation of the measuring device.

19. A measuring device for detecting dimensions of test samples in the form of hollow bodies having a recess, the measuring device comprising:
   at least one light source emitting a light beam;
   a beamsplitter arranged downstream of the light source at a slant to an optical axis of the measuring device and configured to split the light beam into a reference beam and a measuring beam;
   a reference mirror arranged downstream of the beam splitter and laterally displaced away from an optical axis of the measuring device at a lateral spacing relative to the optical axis, wherein the measuring beam forming a measuring arm is supplied to a measuring location of a test sample and is reflected on the measuring location as a first reflected beam and the reference beam forming a reference arm is supplied to the reference mirror and is reflected on the reference mirror as a second reflected beam;

wherein the first and second reflected beams are temporally incoherent and are recombined on the beamsplitter to form a recombined beam;

a receiver arranged such that the recombined beam impinges on the receiver;

wherein the measuring device is configured to be integrated into a tool or to be connected to a tool receptacle.

20. The measuring device according to claim 19, wherein the light source is positioned on the optical axis of the measuring device.

21. The measuring device according to claim 19, wherein the receiver is positioned on the optical axis of the measuring device.

22. The measuring device according to claim 19, wherein an optical travel distance difference ($\Delta s$) between the measuring arm and the reference arm is tuned.

23. The measuring device according to claim 19, further comprising a computer, wherein the receiver is connected to the computer and the computer evaluates the signals received from the receiver.

24. The measuring device according to claim 23, further comprising an analog/digital converter positioned between the receiver and the computer.

25. The measuring device according to claim 19, wherein a tool in which the measuring device is arranged has at least one through opening allowing the measuring beam to reach the measuring location.

26. The measuring device according to claim 19, wherein the measuring device is driven in rotation about an axis of the measuring device.

27. The measuring device according to claim 19, wherein the measuring device, when arranged in a tool is driven in rotation about an axis of the measuring device.

28. The measuring device according to claim 19, wherein the measuring device is rotated together with a tool in which the measuring device is arranged.

29. The measuring device according to claim 19, further comprising a protective housing for enclosing at least one of the light source, the beam splitter, the reference mirror, and the receiver, wherein the housing is arranged in the tool.

30. The measuring device according to claim 29, wherein at least one part of the measuring device is movable in the direction of an axis of the measuring device.

31. The measuring device according to claim 30, wherein the housing is axially movable within the tool.

32. The measuring device according to claim 29, further comprising a linear drive controlled by a computer for moving the at least one part of the measuring device.

33. The measuring device according to claim 19, further comprising a travel measuring system, wherein the measuring device and the tool in which the measuring device is arranged are axially movable, and wherein the travel measuring system is configured to detect a travel distance of the measuring device.

34. The measuring device according to claim 33, wherein the travel measuring system is arranged in the tool.

35. The measuring device according to claim 19, wherein the reference mirror is positioned spaced from or on an axis of rotation of the measuring device.

* * * * *